United States Patent
Uriu

(10) Patent No.: US 9,604,148 B2
(45) Date of Patent: Mar. 28, 2017

(54) MANAGEMENT SERVER OF GAME SERVICE AND METHOD OF PROVIDING GAME SERVICE

(71) Applicant: NHN Entertainment Corporation, Seongnam-si (KR)

(72) Inventor: Takashi Uriu, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 213 days.

(21) Appl. No.: 14/514,038

(22) Filed: Oct. 14, 2014

(65) Prior Publication Data

US 2015/0328547 A1    Nov. 19, 2015

(30) Foreign Application Priority Data

May 16, 2014    (KR) .................. 10-2014-0059185

(51) Int. Cl.
| | |
|---|---|
| *A63F 13/00* | (2014.01) |
| *A63F 9/24* | (2006.01) |
| *A63F 13/798* | (2014.01) |
| *A63F 13/795* | (2014.01) |
| *A63F 13/48* | (2014.01) |

(52) U.S. Cl.
CPC ............ *A63F 13/798* (2014.09); *A63F 13/48* (2014.09); *A63F 13/795* (2014.09)

(58) Field of Classification Search
CPC .......... A63F 13/00; A63F 13/46; A63F 13/48; A63F 13/67; A63F 13/69; A63F 13/75; A63F 13/79; A63F 13/795; A63F 13/798
See application file for complete search history.

(56) References Cited

U.S. PATENT DOCUMENTS

| | | | | |
|---|---|---|---|---|
| 7,311,608 B1* | 12/2007 | Danieli | .................... | A63F 13/12 463/42 |
| 8,328,643 B1* | 12/2012 | Osvald | ................ | G06Q 10/101 434/107 |
| 8,480,494 B2* | 7/2013 | Cantor | .................... | A63F 13/12 463/40 |
| 8,858,322 B2* | 10/2014 | Hayden | ............... | G07F 17/3225 463/25 |
| 2007/0225070 A1* | 9/2007 | Zahorik | .................. | A63F 13/12 463/29 |
| 2013/0225266 A1* | 8/2013 | Mir | ......................... | G07F 17/32 463/25 |

(Continued)

FOREIGN PATENT DOCUMENTS

JP     2013-013445     1/2013

*Primary Examiner* — Milap Shah
(74) *Attorney, Agent, or Firm* — H.C. Park & Associates, PLC

(57) ABSTRACT

A method that for increasing the number of users making a registration to a game service by providing a motivation to a registered user, a game player of the game service, to invite more users to a game. When a user registered to the game service invites a friend to a game, a benefit assignment screen may be displayed on an invitation screen. Corresponding benefits may be determined based on information such as a preference and a skillfulness of the friend about a second game, or personal information of the friend, such as age or sex. In addition, the benefits may be assigned only during a predetermined period of time and accordingly, the registered user may be motivated to invite the friend.

14 Claims, 13 Drawing Sheets

(56) References Cited

U.S. PATENT DOCUMENTS

| | | | |
|---|---|---|---|
| 2013/0252728 A1* | 9/2013 | Kaneyoshi | A63F 13/48 463/29 |
| 2014/0080579 A1* | 3/2014 | Abouchar | G07F 17/3255 463/25 |
| 2014/0378232 A1* | 12/2014 | Rama Rao | H04L 51/32 463/42 |
| 2016/0008720 A1* | 1/2016 | Inukai | A63F 13/795 463/29 |

* cited by examiner

FIG. 7

| User (ID) | ****** 157 | | | | |
|---|---|---|---|---|---|
| Owned game information | Number of downloaded games | | | | |
| | Name of downloaded game | Type | | | |
| | ****** | Puzzle | | | |
| Individual game information | Game name | ****** | | | |
| | Number of logins | N counts | | | |
| | Login frequency | n counts/week | | | |
| | Level | Lv_ 7 | | | |
| | Score | 12345 point | | | |
| | Item | a | b | c | d | e |
| | | 10 | 5 | 1 | 4 | 3 |
| | Friend | Request: M users   Accept: m users | | | | |

FIG. 10

| Invitee candidate list | | | | | |
|---|---|---|---|---|---|
| Registered user(ID) | ＊＊＊＊＊＊１２３ | | | | |
| Invitee user(ID) | Number of invitations | Recent invited date | Preference | Frequency | Skillfulness |
| ＊＊＊＊＊＊１６９ | 0 | —．—．— | 5 | 1 | E |
| ＊＊＊＊＊＊２２１ | 1 | YYYY.MM.DD | 4 | 3 | C |
| ＊＊＊＊＊＊５３７ | 2 | YYYY.MM.DD | 1 | 8 | B |
| ＊＊＊＊＊＊１５７ | 5 | YYYY.MM.DD | 2 | 8 | A |
| ＊＊＊＊＊＊４２１ | 8 | YYYY.MM.DD | 5 | 10 | A |
| ⋮ | ⋮ | ⋮ | ⋮ | ⋮ | ⋮ |

MANAGEMENT SERVER OF GAME SERVICE AND METHOD OF PROVIDING GAME SERVICE

CROSS REFERENCE TO RELATED APPLICATION

This application claims priority from and the benefit of Korean Patent Application No. 10-2014-0059185, filed on May 16, 2014, which is hereby incorporated by reference for all purposes as if fully set forth herein.

BACKGROUND OF THE INVENTION

Field

Exemplary embodiments of the present invention relate to a server configured to provide a game service and a method of providing a game service. More particularly, exemplary embodiments relate to a technology that enables a user registered to a game service to introduce a game to another user.

Discussion of the Background

With the spread of social networking services (SNS), numerous games using the SNS are being provided on a network. Such a game is referred to as an "SNS game" and hereinafter, may also referred to as a "social game." A user, who is an end user of the SNS, may download an application for executing the social game in a terminal device and may play a game by simply entering some personal information such as a user name and a password.

A server configured to provide a social game to users may manage identification information of a registered user and information about game statuses. Also, the social game may provide a friend request service and/or a message exchange service used between users playing the same game. In addition, in an SNS, multiple users are connected over a network. Thus, in many cases, the SNA may provide a service that enables a user playing the social game to transmit an invitation message to another user in order to encourage the other user to participate in the social game.

For example, Japanese Laid-Open Publication No. 2013-013445 discloses a technology that encourages a user, having played a social game, to become an inviter. That is, the user may appeal to another user, for example, an invitee, to participate in the social game. The technology may assign benefits to the user who becomes an inviter.

In a game device and a program disclosed in Japanese Laid-Open Publication No. 2013-013445, an inviter enters a registration code before inviting the invitee. When the invitee accepts the invitation, which corresponds to the registration code, the inviter and the invitee are associated based on the registration code. Accordingly, benefits may be assigned to the inviter.

However, prior to this, there is a need to motivate a registered user, provided with a game service and playing a game, to invite an unregistered user to the game. Among close friends, the registered user may feel motivated to readily invite friends to participate in the game. However, in the case of a friend that is relatively less close, for example, one that just has made an acquaintance, or is quite unlikely to play this kind of game, the registered user may hesitate in inviting the friend to the game.

Accordingly, although an invitation function is added to the game service, the invitation function may not be sufficiently utilized due to social reasons. Although benefits to be allocated to an inviter may be set to be relatively high, the number of unregistered users invited to the game may be low without motivation for broadly inviting friends.

SUMMARY OF THE INVENTION

Exemplary embodiments of the present invention provide a method that may increase the number of users making a registration to a game service by motivating a game player registered to the game service to invite more unregistered users to a game.

Additional features of the invention will be set forth in the description which follows, and in part will be apparent from the description, or may be learned by practice of the invention.

Exemplary embodiments of the present invention disclose a server. The server includes a user information manager configured to identify that the server is in a communicable state with a terminal device of a registered user that is registered to a game service, a registered user related information reader configured to read another user information related to the registered user from a database, an invitee selector configured to select, from the read other user information as an invitee, a user that is unregistered to the game service, an invitation point allocator configured to allocate invitation points using information on the invitee, an invitee display controller configured to display the invitee that is to be invited to the game service and the invitation points on a screen of the terminal device of the registered user, an invitation message creator configured to create a message for inviting the invitee to the game service when the registered user selects the invitee on the screen of the terminal device, a message data outputter configured to transmit the message to the invitee selected by the registered user, an invitee registration verifier configured to determine whether the invitee has made a new registration to the game service, and a benefit assigner configured to allocate the invitation points to the registered user when the invitee registration verifier verifies the registration of the invitee.

Exemplary embodiments of the present invention also disclose a method of providing a game service, the method including, by a game management server in a communicable state with a terminal device of a registered user that is registered to a game service, identifying that the game management server is in the communicable state with the terminal device of the registered user, reading another user information related to the registered user from a database, comparing the read other user information to user information stored in a database included in a server configured to provide the game service, and selecting, as an invitee, a user that is unregistered to the game service, allocating invitation points using information on the invitee, and displaying the invitee that is to be invited to the game service and the invitation points on a screen of the terminal device of the registered user, creating a message for inviting the invitee to the game service when the registered user selects the invitee on the screen of the terminal device, transmitting the message to the invitee selected by the registered user, and determining whether the invitee connects to the game management server and has made a new registration to the game service, and allocating the invitation points to the registered user when the registration of the invitee is verified.

Exemplary embodiments of the present invention also disclose a non-transitory computer-readable media storing a program to operate a computer as a server configured to provide a game service, including identifying that the server is in a communicable state with a terminal device of a registered user that is registered to a game service, reading another user information related to the registered user from a database, comparing the read other user information to user information stored in a database included in the server configured to provide the game service, and selecting, as an invitee, a user that is unregistered to the game service, allocating invitation points using information on the invitee, and displaying the invitee that is to be invited to the game service and the invitation points on a screen of the terminal device of the registered user, creating a message for inviting the invitee to the game service when the registered user selects the invitee on the screen of the terminal device, transmitting the message to the invitee selected by the registered user, and determining whether the invitee connects to a game management server and has made a new registration to the game service, and allocating the invitation points to the registered user when the registration of the invitee is verified.

According to the exemplary embodiments of the present invention, it is possible to provide a registered user corresponding to a game player with invitation information used to invite another user to a corresponding game by including an inviter manager in addition to a game controller configured to provide and execute a social game. Here, bonus points may be allocated to a registered user with respect to a predetermined invitee based on attributes of the invitee and thus, invitation information may motivate a user hesitating in inviting another user to invite the other user to the game.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 illustrates a configuration of a data table of game information according to exemplary embodiments of the present invention.

FIG. 10 illustrates an example of an invitee candidate list according to exemplary embodiments of the present invention.

DETAILED DESCRIPTION OF THE ILLUSTRATED EMBODIMENTS

Figure 1:
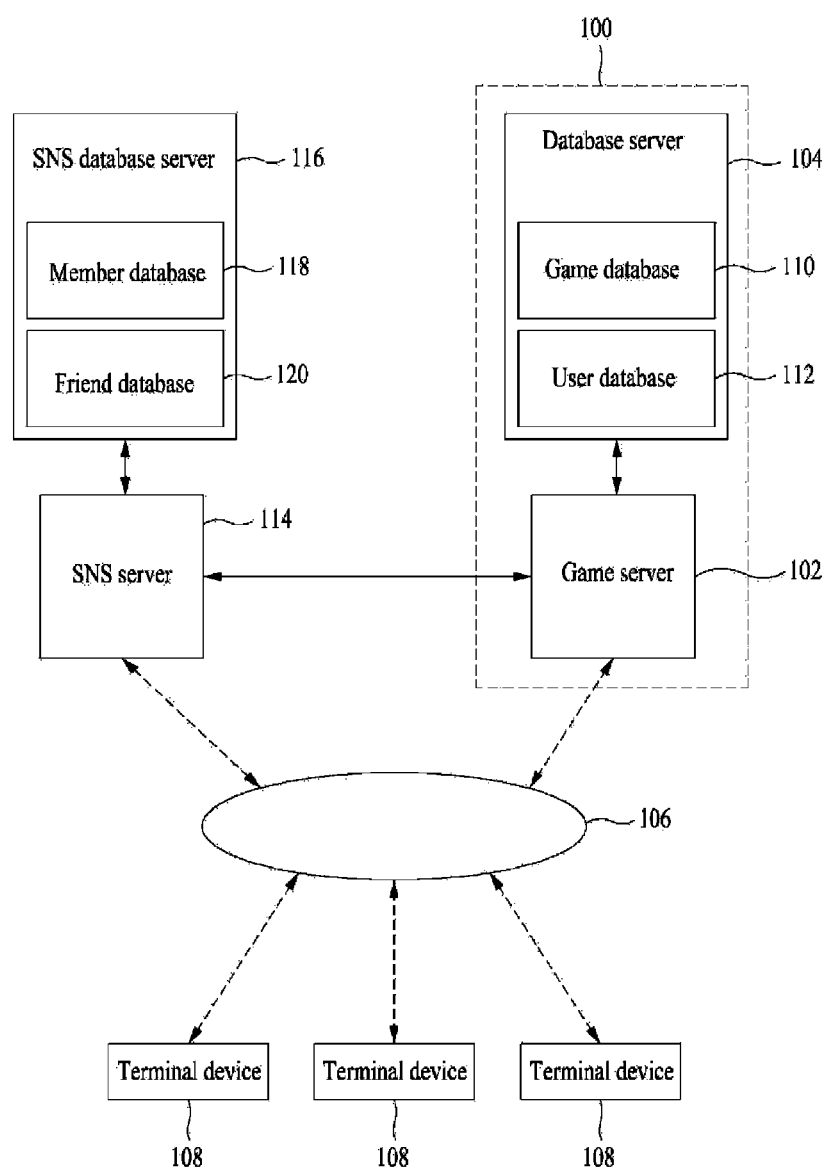
FIG. 1 illustrates a relationship between the entire configuration of a game service providing system and a terminal device of a user according to exemplary embodiments of the present invention.

Exemplary embodiments of the present invention will be described in detail with reference to the accompanying drawings. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Thus, a detailed description described below should not be construed as being restrictive. In addition, the scope of the present invention is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing example embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof. It will be understood that when an element is referred to as being "connected to" another element, it can be directly connected to the other element, or intervening elements may be present.

First, the entire configuration will be described.

FIG. 1 illustrates a relationship between the entire configuration of a game service providing system 100 and a terminal device 108 of a user provided with a service from the game service providing system 100 according to exemplary embodiments of the present invention. Referring to FIG. 1, the game service providing system 100 includes a game server 102 and a database server 104. The game server 102 is connected to an electric communication line 106, which may include, for example, the Internet. The terminal device 108 may communicate with the game server 102 through the electric communication line 106. The electric communication line 106 is not limited to the Internet, however, and may include, for example, a telephone line, a game exclusive line, or a local area line, and may also be a combination of such lines and the Internet.

The terminal device 108 may access the game server 102. The game server 102 may execute a game program while communicating with the corresponding terminal device 108. Additionally, the game server 102 performs processing of storage and reading functions, including those in or from the database server 104. Database information may include information about a registered user playing a game, and game data such as a game score.

The database server 104 may include a game database 110 configured to store game data and a user database 112 configured to store information on the registered user. Game data corresponding to a case in which the registered user has played a game may be stored in the game database 110. Personal information, for example, identification information including a user ID and password, an age, a sex, and a birth date of the registered user, may be stored in the user database 112.

Also, a social networking service (SNS) server 114 configured to provide an SNS is connected to the electric communication line 106. An SNS database server 116 connected to the SNS server 114 includes a member database 118 and a friend database 120. Member information stored in the member database 118 may include member information. For example, member information may include a user name, a user ID, a password, a mail address, a sex, and a birth date. In addition, a "friendship" status between members may be stored in the friend database 120. In the exemplary embodiments of the present invention, the term "friendship" refers to information indicating a relationship that is set as friends between members, and includes a friendship set by a service provider of an SNS or a friendship registered by implementing a friend request and approval between members. Members indicated as having a friendship may perform mutual communication.

In the exemplary embodiments, the term "registered user" refers to a user that is registered to a game service, for example, a game service including an invitation service, and also refers to a user that is registered to an SNS.

In the exemplary embodiments, the game server 102 and the SNS server 114 may communicate with each other. That is, the game server 102 may obtain information stored in the friend database 120 of the SNS database server 116 through communication with the SNS server 114. For example, the game server 102 may designate a user name or user ID, and may obtain another user ID that is in a friendship with the designated user name or user ID. Similarly, the SNS server 114 may also designate a user name or user ID, and may obtain information about a game service registered to the designated user name or user ID.

Although an online social game is generally provided from the game server 102 to a user side, a game executed by downloading an application program of the game to the terminal device 108 or a browser game not requiring downloading may be provided from the game server 102 to the user side. A user registered to a game service may control the terminal device 108 connected to the game server 102 through the electric communication line 106 and, thus, may be provided with the game service. In addition, in the exemplary embodiments, a social game may include a game that enables a user using a game service to communicate with another user using the same service.

When an application program is installed in the terminal device 108 of the user, the game server 102 performs data processing for a game progress in response to an input control of the user on the terminal device 108. Game server 102 may transmit game screen data in order to display the data processing result on a screen of the terminal device 108.

The terminal device 108 may be a terminal connected to the electric communication line 106. For example, the terminal device 108 may include a mobile telephone, for example, a smartphone, having a telephone function and an Internet reading function, a mobile phone, a game exclusive terminal, a personal computer, and a tablet computer.

In the exemplary embodiments, a user of a game service needs to be registered in order to be provided with the game service from the game service providing system 100. A registered user, having completed a registration to a game service, may attempt to induce an unregistered user to the game service to register for game service. The registered user may transmit an invitation mail for the game the user is registered for, to the unregistered user.

In the exemplary embodiments, the game server 102 may include a game mode, in which a registered user plays a game. The game server 102 may also include an invitation mode in which unregistered user candidates to be invited are displayed, and in which when the registered user may invite an unregistered user, including the user candidates.

Information on an unregistered user may be extracted. The game server 102 obtains friendships (i.e. friend data of the registered user through the SNS server 114) and compares the obtained friend data to information stored in the user database 112 of the database server 104 to verify if a corresponding friend is registered to a corresponding game service.

When the unregistered user is extracted, the game server 102 performs processing of displaying invitee candidates and benefits on the screen of the terminal device 108 of the registered user corresponding to an inviter. For example, points given in response to a success in the invitation. When an individual user corresponding to an invitee has made a new registration to a corresponding game service, the game server 102 may assign benefits to the user corresponding to an inviter. Throughout the present specification, the term "inviter" refers to a user that is registered to a game service who may invite an unregistered user to the game service or a corresponding game. The term "invitee" refers to a user that is unregistered to a predetermined game service and thus, is invited to the game service or a corresponding game by a registered user corresponding to an inviter.

Figure 2:
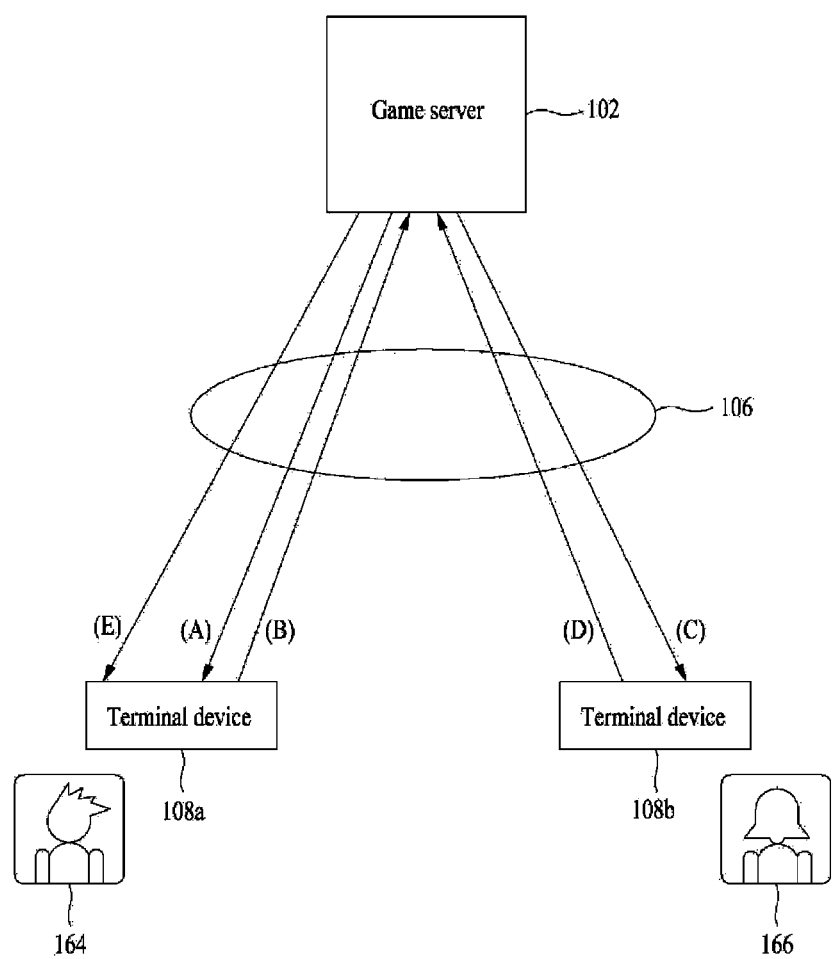
FIG. 2 illustrates an example in which a registered user of a game service invites an unregistered user to the game service according to exemplary embodiments of the present invention.

FIG. 2 illustrates an example in which a registered user 164 invites an unregistered user 166 to a game to which the registered user 164 is registered. Here, the registered user 164 and the unregistered user 166 are registered as friends in the user database 112 and thus, are associated with each other.

In an invitation mode for inviting a friend to a game, the game server 102 displays an invitee candidate list on a screen of a terminal device 108*a* of the registered user 164. As represented by (A) in FIG. 1, user names of invitee candidates, including nicknames registered to an SNS, avatars, and rewards (i.e. "points") to be allocated to the inviter in response to a successful invitation may be displayed on the screen of the terminal device 108*a*.

Figure 3:
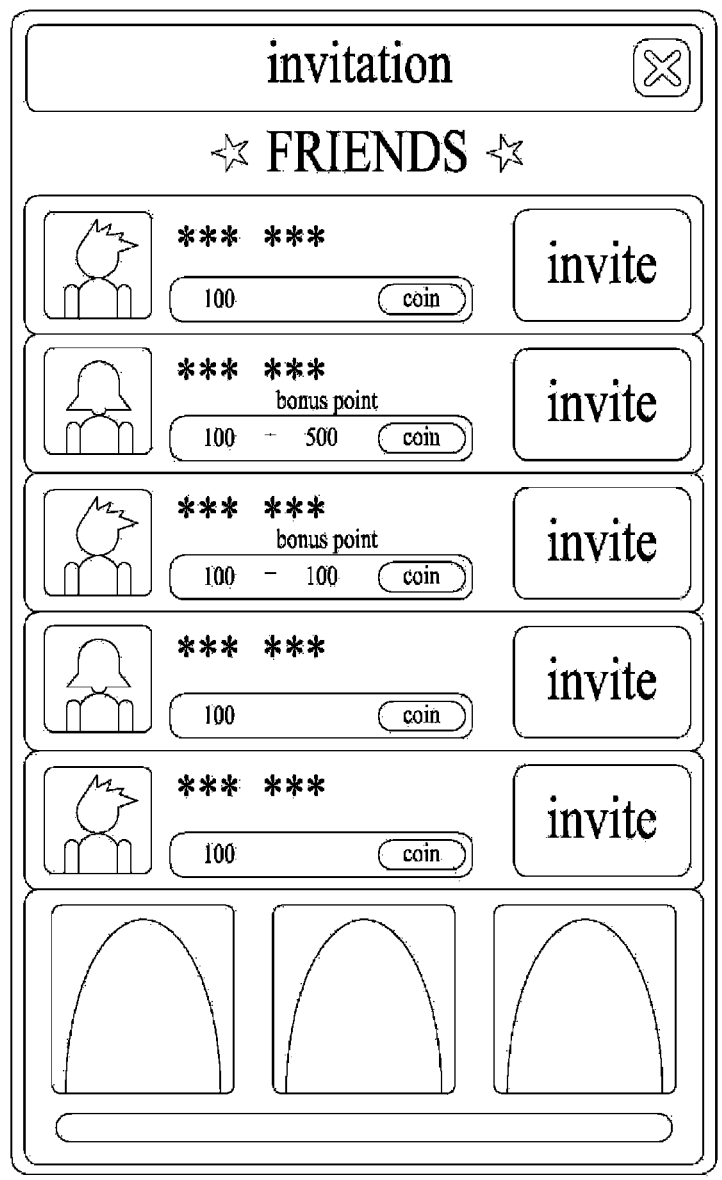
FIG. 3 illustrates an example of invitee candidates displayed on a terminal device of a registered user according to exemplary embodiments of the present invention.

FIG. 3 illustrates an example of invitee candidates displayed on the terminal device 108*a* of the registered user 164. In addition to attributes of an invitee candidate, such as a user name and an avatar of the invitee candidate, points to be allocated to the registered user 164 in the case that inviting the invitee candidate results in a successful registration ("successful invitation") are displayed on the screen of the terminal device 108a. The points may include generally obtainable points for any successful invitation, and bonus points to be allocated to the registered user 164 in the case of a successful invitation of a certain invitee. Whether to assign a weight resulting in bonus points with respect to a certain invitee may be determined by the game server 102 based on game data related to the invitee or user information obtained from the SNS server 114. A configuration and a method of assigning the weight will be described below.

The registered user 164 selects a desired unregistered user, for example, the unregistered user 166, from an invitee candidate list displayed on the screen of the terminal device 108. According to this example, when bonus points are indicated in addition to general points, the registered user 164 may be motivated to invite a corresponding unregistered user. That is, unless bonus points are indicated, the registered user 164 may generally select a close friend instead of a friend with a more distant connection. However, when bonus points are indicated, the registered user 164 may be highly motivated to attempt to invite a corresponding user irrespective of preconception about a friend with a distant connection, such as "this person does not like playing a game so much".

When the registered user 164 selects and invites an unregistered user from the invitee candidate list displayed on the screen of the terminal device 108a, corresponding information is transmitted to the game server 102 (the information transmission represented by (B) of FIG. 2). The game server 102 creates a message to be transmitted to a corresponding invitee and transmits an invitation mail (the transmission represented by (C) of FIG. 2) to a terminal device 108b of the corresponding invitee, for example, the unregistered user 166 of FIG. 2.

Figure 4:
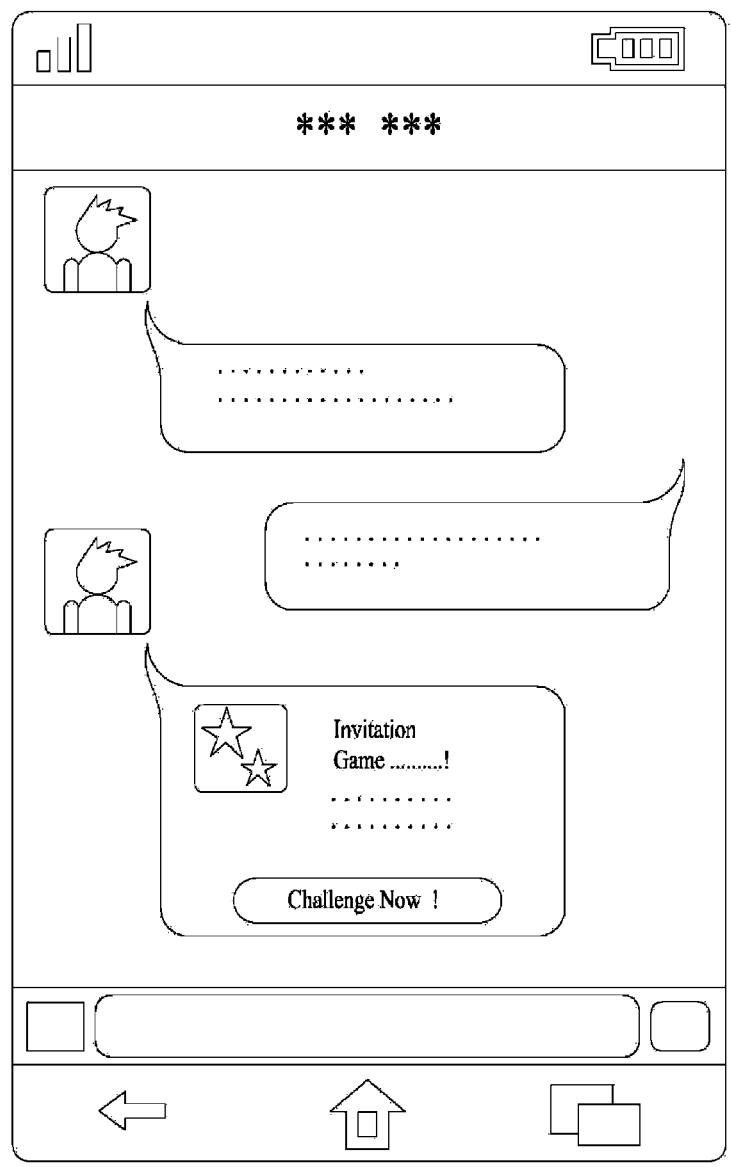
FIG. 4 illustrates an example of an invitation mail transmitted to an unregistered user according to exemplary embodiments of the present invention.

The invitation mail may be transmitted to the unregistered user 166 through, for example, the SNS server 114. Since the unregistered user 166 is not using the same game service with the registered user 164, and, thus, they cannot communicate through the game service, transmitting the invitation mail through an SNS may be appropriate. FIG. 4 illustrates an example of an invitation mail transmitted to the unregistered user 166. Referring to FIG. 4, a message of the invitation mail includes a nickname or an avatar of the registered user 164 corresponding to an inviter and a message indicating invitation to a new game. In addition, the message of the invitation mail may also include an icon or a uniform resource locator (URL) for prompting an invitee to make a new registration to a corresponding game service.

The unregistered user 166, having received the invitation mail using the terminal device 108b may verify the message of the invitation mail and may, for example, move to a new registration screen of the corresponding game service through the icon or the URL displayed on the screen of the terminal device 108b and may perform a new registration (the performing of the registration represented by (D) of FIG. 2).

When a new registration request of the unregistered user 166 is verified, the terminal device 108a may allocate points to the registered user 164 corresponding to the inviter (the allocation of points represented by (E) of FIG. 2). Here, when the unregistered user 166 is a target associated with bonus points, the bonus points may be allocated to the registered user 164. Benefits to be assigned to the registered user 164 having succeeded in the invitation are not limited to points and thus, may include a benefit advantageous to play a game, for example, an item used while playing a game. Likewise, benefits may also be conferred on unregistered user 166 when unregistered user 166 completes his registration. Thus, when attractive new invitation and registration benefits are provided even to an invitee, the invitee may also be motivated to participate in playing a game.

Bonus points displayed together with an invitee candidate list may not be the same at all times and instead, may vary based on a date or a period. For example, when bonus points allocated to an inviter are set to decrease over time, the registered user 164 may be highly motivated to invite the unregistered user 166 when the bonus points to be allocated are relatively high, and thus, may more feel more motivated to invite the unregistered user 166 to a game service at that time.

Figure 5:
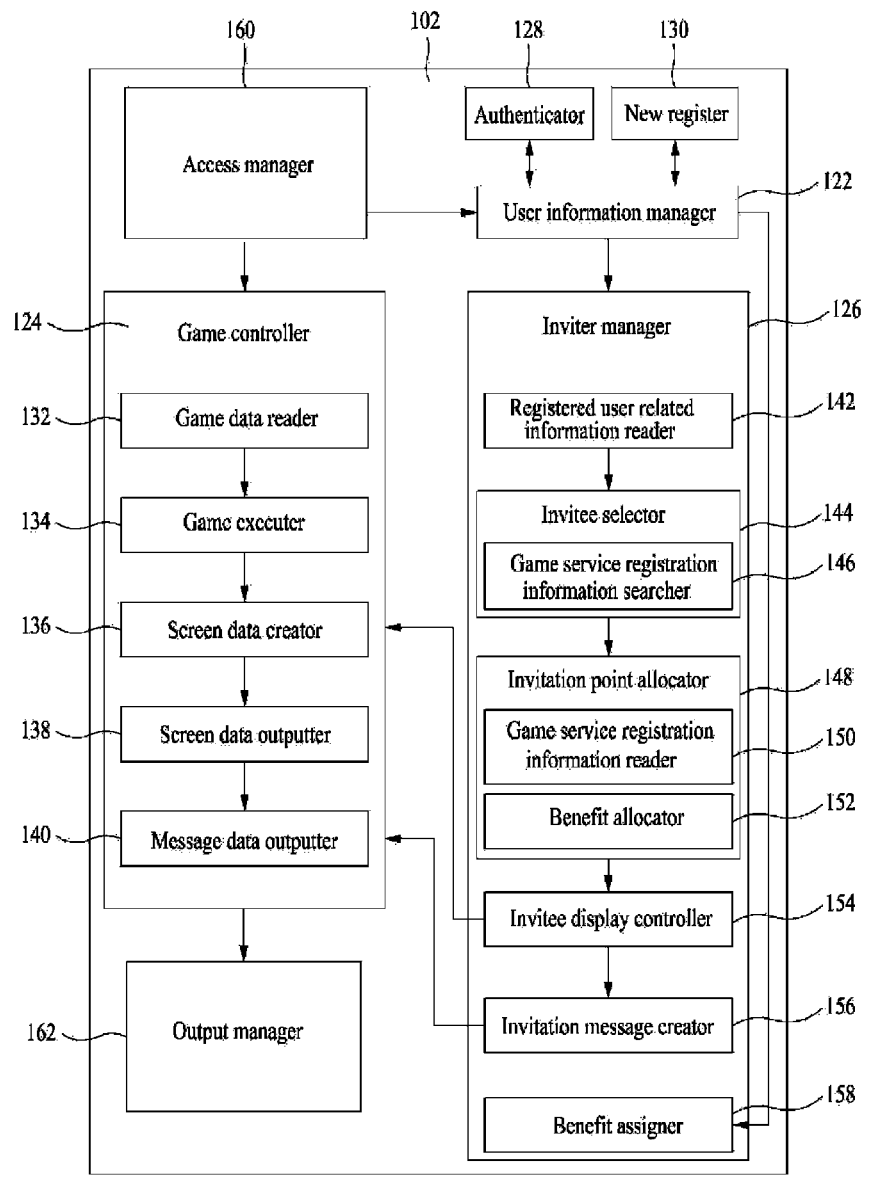
FIG. 5 illustrates a block diagram describing a game server according to exemplary embodiments of the present invention.

Hereinafter, a configuration of the game server 102 having the aforementioned invitation function will be described with reference to FIG. 5. FIG. 5 illustrates a block diagram describing a function of the game server 102 according to exemplary embodiments of the present invention.

Referring to FIG. 5, the game server 102 includes a user information manager 122, a game controller 124, an inviter manager 126, an access manager 160, and an output manager 162. The constituent elements may provide a game service to a registered user through mutual cooperation.

Initially, the user information manager 122 will be described. The user information manager 122 includes an authenticator 128 configured to perform authentication as to whether a user, having logged in the game server 102, is a registered user by controlling a terminal device. The authenticator 128 performs authentication on the registered user by referring to the user database 112. When a user is found to be registered user in the user database 112, the user information manager 122 allows a login. With respect to a user that is creating a new registration, a new register 130 performs registration processing and stores registration data in the user database 112. Information on the logged-in registered user may also be transmitted to the game controller 124 and the inviter manager 126.

Also, the user information manager 122 may determine whether an invitee may create a new registration to a game service. In addition, the access manager 160 may receive a login request from a user, and may output login data to the user information manager 122.

Hereinafter, the game controller 124 will be described. The game controller 124 performs data processing for a game progress of the game server 102 in response to an input control of a user on the terminal device 108, and transmits game screen data in order to display the data processing result on the screen of the terminal device 108. Also, in conjunction with the inviter manager 126, the game controller 124 may display an invitation screen on the terminal device 108 of the registered user and may output message data to be transmitted to an invitee.

The game controller 124 includes a game data reader 132, a game executer 134, a screen data creator 136, a screen data outputter 138, and a message data outputter 140. The respective functions of the above constituent elements may interact with each other and may operate so that a game may be smoothly executed on the terminal device 108 of the registered user.

The game data reader 132 reads a game program played by the registered user from the game database 110 of the database server 104. Game programs stored in the game database 110 include various genres of game programs. For example, a game program may be at least one from an action genre, a shooting genre, a racing genre, a puzzle genre, and a role playing genre.

Figure 6:
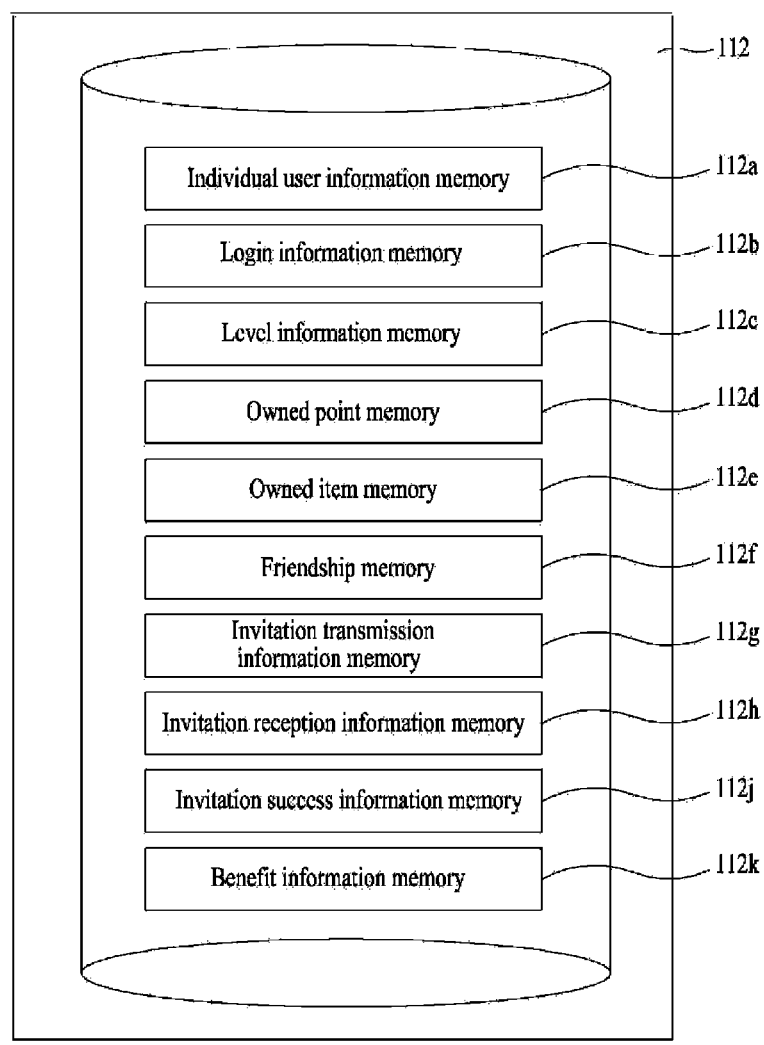
FIG. 6 illustrates an example of game information stored in a user database according to exemplary embodiments of the present invention.

The game data reader 132 reads game information of each user from the user database 112 of the database server 104. FIG. 6 illustrates an example of game information stored in the user database 112. Referring to FIG. 6, the user database 112 includes, as game information, an individual user information memory 112a, a login information memory 112b, a level information memory 112c, an owned point memory 112d, an owned item memory 112e, a friendship memory 112f, an invitation transmission information memory 112g, an invitation reception information memory 112h, an invitation success information memory 112j, and a benefit information memory 112k. Game information may be specified based on identification information, such as a user ID stored in the individual user information memory 112a. A variety of data created by playing a game may be stored in each memory together with a login history stored in the login information memory 112b. For example, a level of a game player is stored in the level information memory 112c, and points and items obtained by the game player while playing a game are stored in the owned point memory 112d and the owned item memory 112e, respectively. Also, a friendship obtained through an invitation function, a relationship between invitation transmission and invitation reception, and information about obtained benefits as a result of the invitation may be stored in the friendship memory 112f, the invitation transmission information memory 112g, the invitation reception information memory 112h, and the benefit information memory 112k, respectively.

The game executer 134 performs processing for a game progress based on data read by the game data reader 132 in a game mode. For example, game progress may include a mode in which a game is being executed, and control information transmitted from the terminal device 108 of the user side. Modes in which a game is being executed may include a game mode and an invitation mode.

In a game mode, the screen data creator 136 creates screen data to be displayed on the screen of the terminal device 108 of the user side based on processing content of the game executer 134. In an invitation mode, the screen data creator 136 creates screen data to display an invitee candidate list, such as the one exemplified in FIG. 3. In addition, the screen data may include image data or text data, and may also additionally include sound data including sound effects.

The screen data outputter 138 converts the screen data created by the screen data creator 136 to a format displayable on the terminal device 108 of the user side. Depending on need, the screen data outputter 138 may compress data and may place the data in an optimal state to be output.

In a game mode, the message data outputter 140 may output a message to the user describing controls of a game. In an invitation mode, the message data outputter 140 may output message data to be transmitted to an invitee. The message data may include formatted text such as a title or a description of a game. Data created by the game controller 124 may be transmitted to the user's terminal device 108 through the output manager 162.

Hereinafter, the inviter manager 126 will be described. In an invitation mode, the inviter manager 126 creates data for inviting a friend, and transmits the data to the screen of the terminal device 108 of the registered user. Referring to FIG. 5, the inviter manager 126 includes a registered user related information reader 142, an invitee selector 144, an invitation point allocator 148, an invitee display controller 154, an invitation message creator 156, and a benefit assigner 158.

The registered user related information reader 142 connects to the SNS server 114, and obtains information on another user that has a friendship with the registered user, from the friend database 120 of the database server 116.

The invitee selector 144 extracts an unregistered user to information reader 142 for the registered user to invite to the game from a friend list of the registered user. For example, the invitee selector 144 may include a game service registration information searcher 146 configured to search the user database 112 of the database server 104. The game service registration information searcher 146 conducts a search as to whether a user included in the friend list is included in users registered to this game. The invitee selector 144 creates an invitee candidate list by extracting unregistered users from the friend list based on the search result.

With respect to each of invitees, that is, users to be invited stored in the invitee candidate list created by the invitee selector 144, the invitation point allocator 148 allocates points to be given to the inviter when the registered user succeeds in an invitation. Points to be allocated with respect to each invitee, and may include general points to be generally allocated for any successful invitation and bonus points to be allocated with respect to certain specific invitees.

Bonus points to be allocated may be determined based on attributes of an invitee. The attributes of the invitee refer to parameters, such as a derived preference, frequency, or skillfulness, of the invitee about a game in addition to personal information such as a sex or an age of the invitee. The parameters may be obtained from the user database 112 by a game service registration information reader 150. For example, the game service registration information reader 150 obtains data stored in the login information memory 112b, the level information memory 112c, the owned point memory 112d, and the owned item memory 112e of the user database 112.

The invitation point allocator 148 may create a data table of game information of FIG. 7, based on the above information. Referring to FIG. 7, the data table includes owned game information and individual game information. The owned game information includes a game name and a game type. The game type may be a general genre of the owned games, for example, an action genre, a shooting genre, a racing genre, a puzzle genre, and a role playing genre. The individual game information may include the number of logins and/or a login frequency. For example, a frequency as to the number of logins performed for a week, a game level, a score, the number of items, an item type, and the number of friends, may all be part of the individual game information.

The benefit allocator 152 determines whether bonus points are obtainable when the registered user corresponding to an inviter completes a successful invitation, based on data obtained by the game service registration information reader 150. The bonus points are allocated with respect to a specific invitee based on attributes of the invitee. As stated above, attributes about the invitee, which may include a perceived preference, a frequency, or a skillfulness of the invitee, may be employed as a determination standard.

For example, a genre of a game that a registered user desires to invite an invitee may from a genre of a game that the invitee likes. For example, when the registered user desires to invite the invitee to an action game, however, the invitee mostly plays a role playing game, an invitation difficulty may be determined to be "high" and thus, bonus points may be set to be relatively high. A game that the registered user desires to invite the invitee to a game may caters to advanced players, however, the invitee is a beginner based on a difficulty level of the game, or vice versa. In this example, a game catering to beginners or a game catering to advanced players, the invitee may hesitate in accepting the invitation and thus, bonus points to be allocated in response to a successful invitation may be set to be relatively high.

Also, information as to whether the invitee is a type of a user who regularly denies invitations or a type of a user easily accepting of an invitation may be obtained from data stored in the invitation transmission information memory 112g and the invitation reception information memory 112h of the user database 112 of FIG. 6. For example, when the invitee is not a type of a person who readily accepts an invitation from another person, bonus points to be allocated in the case of a successful invitation may be set to be relatively high.

The invitee display controller 154 creates display screen data that includes data about the invitee. For example, the invitee display controller 154 creates display data so that invitees may be displayed in descending order of bonus points in an invitee candidate list created by the invitee selector 144. Also, the invitee display controller 154 may create display data so that bonus points may be highlighted. Display data created by the invitee display controller 154 is transmitted to the screen data creator 136 and used to create a display screen in an invitation mode. The display screen may be a screen on which a user name and an avatar of the invitee, points to be allocated in the case of a successful invitation, and additional bonus points are displayed as illustrated in FIG. 3.

The invitation message creator 156 creates message data to be transmitted to an invitee selected by the registered user. The message data may include text data that encourages the invitee to become interested, such as benefits for a new registration, in addition to formatted document such as a title or a manual of a game. The message data created by the invitation message creator 156 is transmitted to the message data outputter 140, and output in a form in which at least one of text data, images, and sound data is added.

When the invitee creates a new registration to a game that the registered user invites the invitee to in response to the invitation, the user information manager 122 performs new registration processing using the new register 130. Also, in the case of a successful invitation, the user information manager 122 allocates corresponding points to the registered user. When the invitee is a target user of bonus points, the user information manager 122 instructs the benefit assigner 158 to allocate bonus points (or another benefit) to the registered user having succeeded in the invitation.

As described above, the game server 102 of FIG. 5 may provide the registered user corresponding to a game player with invitation information used to invite another user to the corresponding game by including the inviter manager 126 in addition to the game controller 124. In this case, bonus points to be allocated to the registered user in the case of a successful invitation may be set in the invitation information. Accordingly, and dissimilar to the related art, even a registered user who generally would not invite another user may be motivated to invite the other user to the corresponding game.

Hereinafter, a method of providing a game service according to exemplary embodiments of the present invention will be described. The game service providing method according to exemplary embodiments of the present invention will be described with reference to FIG. 8 and FIG. 9. In the exemplary embodiments, the game service providing method may employ a game mode in which a social game is executed, that is, a game is played, and an invitation mode in which a registered user invites another user to a corresponding game. The following description will be made based on an operation in the invitation mode.

Figure 8:
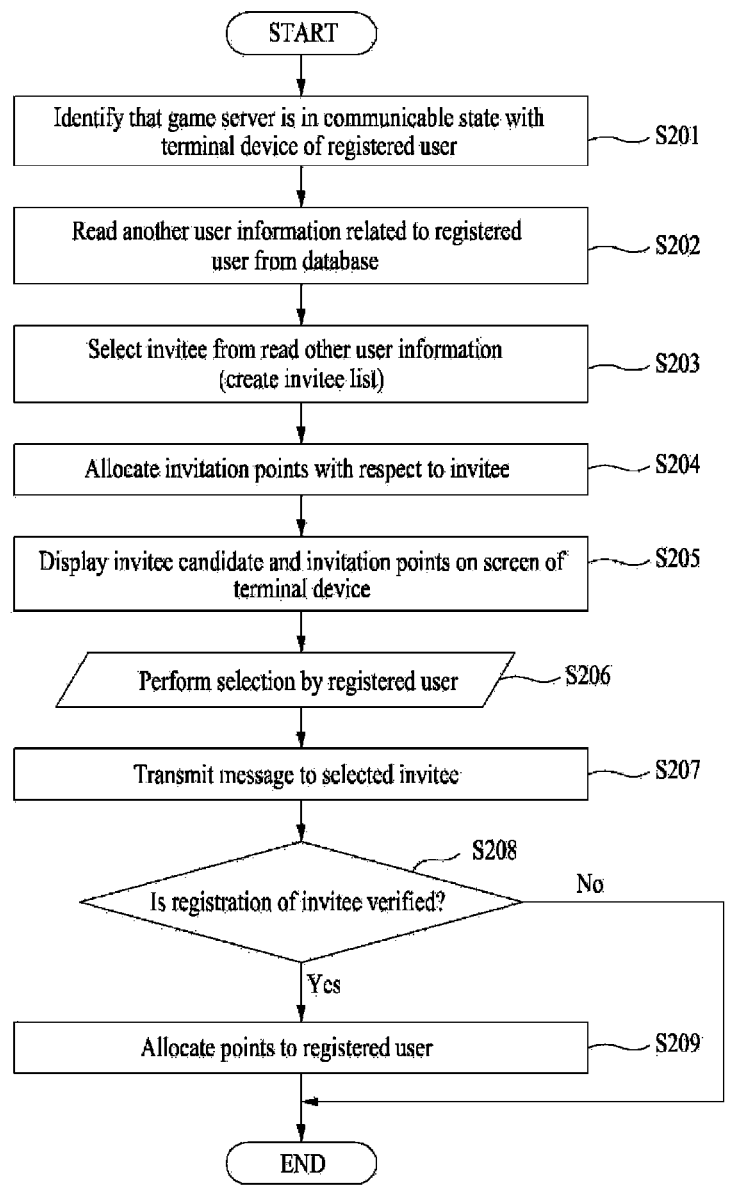
FIG. 8 is a flowchart illustrating a method of providing a game service according to example embodiments of the present invention.

FIG. 8 is a flowchart describing a game operating in an invitation mode. Referring to FIG. 8, in operation S201, the game server 102 identifies that the game server 102 is in a communicable state with a terminal device of a registered user that is registered to a game service. In operation S202, the game server 102 connects to the SNS server 114 and reads another user's information, the another user having some relation to the registered user, determined by a database. An example of another user having some relation to the registered user may include a user that the registered user has registered as a friend within an SNS.

In operation S203, the game server 102 selects an invitee from the other user's information, which was read by the game server 102 in step S202. That is, the game server 102 creates an invitee candidate list, which will be further described with reference to FIG. 9.

Figure 9:
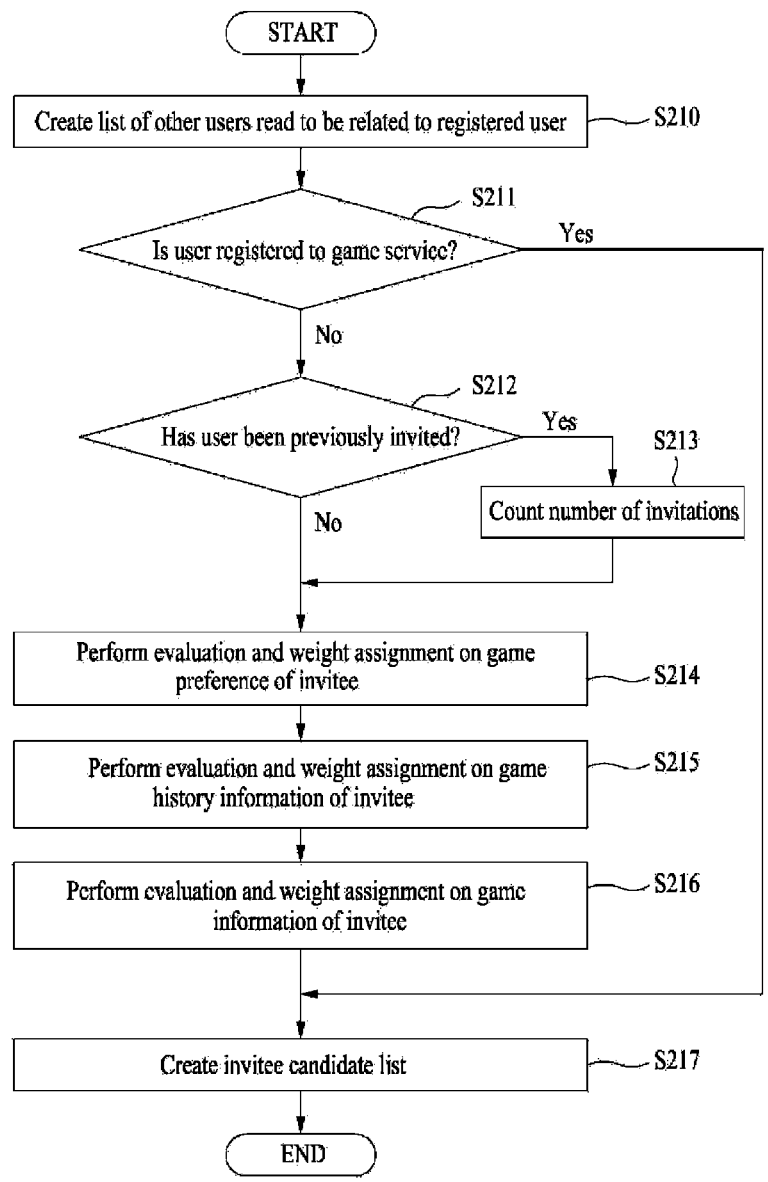
FIG. 9 is a flowchart illustrating a method of providing a game service according to exemplary embodiments of the present invention.

Referring to FIG. 9, in operation S210, the game server 102 creates a list of other users read to be related to the registered user. The game server 102 determines whether a user included in the list is already registered to a game service that the registered user may invite the user to. In detail, in operation S211, the game server 102 determines whether the user is registered by searching the individual user information memory 112a of the user database 112 using the game service registration information searcher 146. In operation S217, the game server 102 updates an invitee candidate list excluding the user registered to the game service.

In operation S212, the game server 102 determines if an unregistered user, has been previously invited. That is, the game server 102 determines if the unregistered user has a previous invitation history. The game server 102 determines whether the user, for example, the invitee candidate, has been invited by reading the invitation reception information memory 112h of the user database 112 using the game service registration information reader 150.

In operation S213, when the user has been previously invited, the number of times that the user, for example, the invitee candidate having been invited from the registered user corresponding to the inviter may be counted.

In operation S214, the game server 102 performs evaluation and weight assignment on a game preference of the invitee using the invitation point allocator 148. The game server 102 determines a genre of a game that the invitee candidate likes based on data stored in the individual user information memory 112a or the login information memory 112b. For example, when a genre of a game that the registered user desires to invite an invitee to differs from a genre of a game that the invitee likes, (for example, when the registered user desires to invite the invitee to an action game, however, the invitee likes a role playing games), an invitation difficulty may be determined to be relatively high and thus, a parameter value may be set by assigning a weight based on the invitation difficulty In operation S215, the game server 102 performs evaluation and weight assignment on game history information of the invitee. The game server 102 evaluates a frequency that the invitee plays games based on the number of logins and login frequency of the invitee that are stored in the login information memory 112b of the user database 112, and assigns a weight. For example, when the number of logins and the login frequency are small, the game server 102 determines that the invitee may be unlikely to register for the game he is being invited to, and thus, an invitation difficulty in inviting the invitee to a new game may be determined to be relatively high. Accordingly, a parameter value may be set by assigning a weight based on the invitation difficulty.

In operation S216, the game server 102 performs an evaluation and weight assignment using the game information of the invitee, which may include game information about games other than the game the invitee is being invited to. For example, the game server 102 may evaluate a skill of the invitee candidate on a game based on data stored in the level information memory 112c, the owned point memory 112d, and the owned item memory 112e of the user database 112, and assigns a weight. For example, the skill level of an invitee candidate may be considered high when an experience value of his game character and the number of attacks on a dungeon is high and the invitee candidate owns a large number of items. When a game that the registered user desires to invite the invitee to is a game that caters to beginners, and a skill level of the invitee candidate is high, the invitee may want to disregard the invitation. Accordingly, bonus points to be allocated in response to a successful invitation may be set to be relatively high.

Invitee candidates are selected through the aforementioned evaluation operations. In practice, the aforementioned process is performed on each invitee candidate. In operation S217, the game server 102 creates the invitee candidate list. FIG. 10 illustrates an example of an invitee candidate list according to example embodiments. Referring to FIG. 10, the invitee candidate list may include an invitee's name (for example, a user ID), a number of invitations indicating the number of times that a corresponding invitee has been invited, and the date of the most recent invitation. Here, the preference, frequency, skill level of the invitee with regards the game may be indicated in the invitee candidate list using a numerical value or a different ranking system. For example, an invitee's preference, the frequency, and the skill level with regards to the game may be displayed in five stages using numerical values, and may also be displayed in predetermined rankings using alpha values such as A, B, C, etc. The invitee candidate list may be sorted so that a user who has been invited the least number of times may rank at the top.

Referring again to FIG. 8, when the invitee candidate list is created in operation S203, the game server 102 allocates invitation points with respect to the invitee in operation S204. The game server 102 may allocate invitation points using the invitation point allocator 148. The invitation point allocator 148 may allocate bonus points with respect to a predetermined invitee candidate in addition to general points, by referring to the invitee candidate list of FIG. 10. For example, the game server 102 may determine that a user relatively frequently may be reluctant to accept an invitation and thus, an invitation difficulty may be determined to be relatively high. Accordingly, bonus points may be set to be relatively high. Additionally, bonus points may be set to be relatively high with respect to an invitee who plays games less frequently.

In operation S205, when bonus points are allocated with respect to the predetermined invitee candidate in the invitee candidate list, the game server 102 displays the invitee candidate and invitation points on a screen of the terminal device. In addition to some attributes of an invitee, such as a user name and an avatar of the invitee candidate, points to be allocated to the registered user in response to a success in inviting the corresponding invitee may be displayed on the inviter's screen when the game is in invitation mode. An example thereof is described above with reference to FIG. 3.

In operation S206, the registered user selects a user that the registered user desires to invite to a game on the screen of the terminal device 108 on which invitee candidates are displayed. This operation is performed in such a manner such that the registered user may control the terminal device 108 according to an instruction displayed on the screen.

When the registered user selects a certain invitee from among the invitee candidates by controlling the terminal device 108, the game server 102 transmits a message to the selected invitee in operation S207. The game server 102 may transmit the message to the selected invitee using a message transmission function, for example, the message data outputter 140. Alternatively, the game server 102 may connect to the SNS server 114 and may transmit the message to the selected invitee through the SNS server 114.

When the user information manager 122 determines that the invitee has created a new registration to a game in operation S208, the game server 102 allocates points to the registered user having transmitting the message in operation S209. Points to be allocated to the registered user may include bonus points as well as general points. On the contrary, when the invitee has not made a new registration to a game, processing is terminated.

Figure 11:
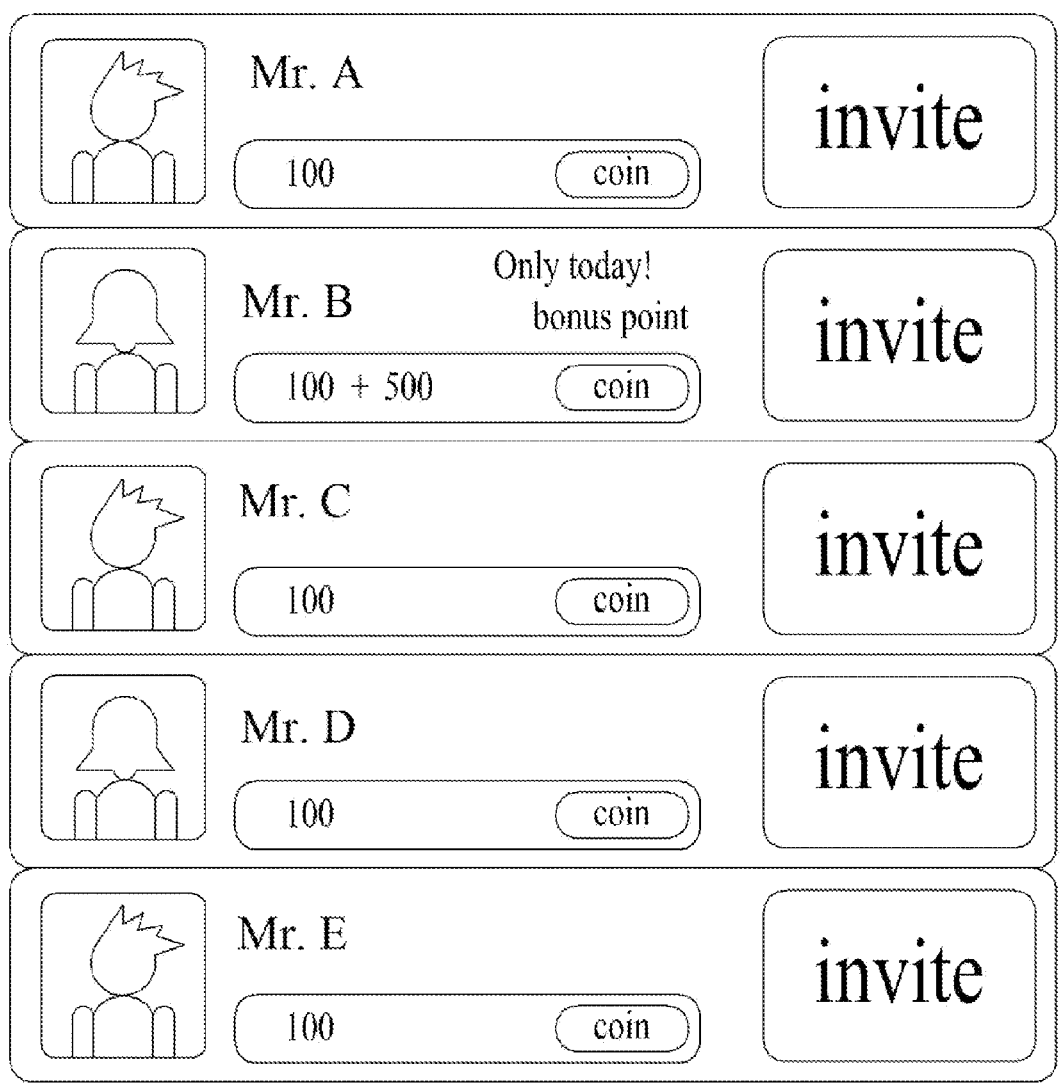
FIG. 11 illustrates an example of invitee candidates displayed on a terminal device of a registered user according to exemplary embodiments of the present invention.

As described above, in the case of allocating bonus points by modifying points to be allocated only with respect to a certain invitee, an allocation period of the bonus points may be limited. When an invitee corresponding to a bonus point target is not invited within a predetermined period, another invitee may be selected as the bonus point target. For example, referring to FIG. 11, bonus points are allocated with respect to "Mr. B" and in this instance, it may be highlighted on the screen that unless a corresponding registered user invites "Mr. B" within the day, the registered user cannot obtain bonus points. As described above, by limiting the allocation period of bonus points, the registered user may be motivated to quickly invite a corresponding user among invitee candidates.

Figure 12:
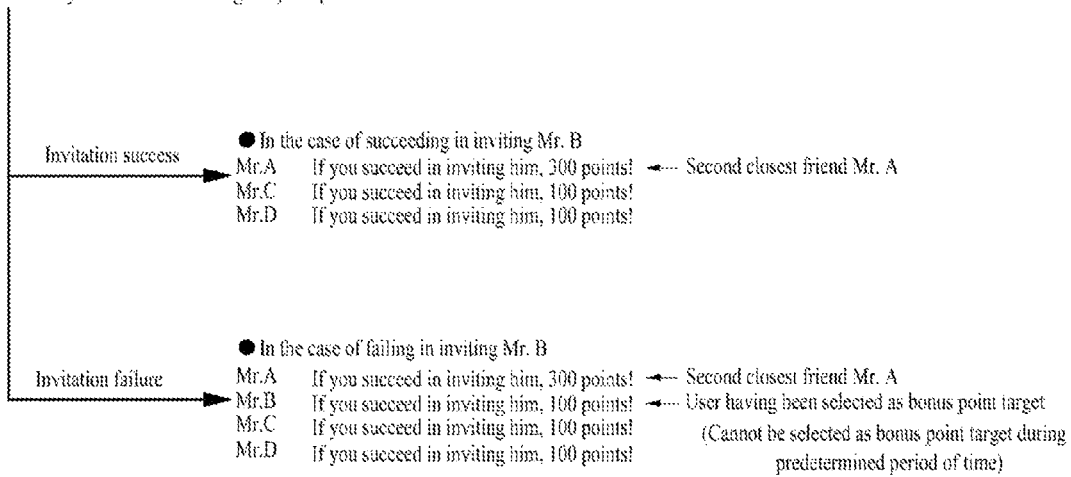
FIG. 12 illustrates an example of allocating bonus points in a game service providing method according to exemplary embodiments of the present invention.

Also, referring to FIG. 12, an invitee corresponding to a bonus point target capable of allocating bonus points to the registered user may vary depending on an invitation success case and an invitation failure case. Also, bonus points may not be allocated during a predetermined period of time with respect to an invitee that the registered user has failed in inviting. For example, referring to FIG. 12, bonus points are allocated with respect to "Mr. B" that is a closest friend of the registered user out of the listed users. In an invitation success case, that is, when the registered user succeeds in inviting "Mr. B", bonus points are then allocated with respect to "Mr. A" that is a second closest friend of the registered user. On the contrary, in an invitation failure case, that is, when the registered user fails in inviting "Mr. B", bonus points are allocated with respect to the second closest friend "Mr. A". At the same time, bonus points may not be allocated with respect to "Mr. B" for a predetermined period of time.

In addition, bonus points may be allocated to the registered user with respect to a single user included in an invitee candidate list and may also be allocated to the registered user with respect to a plurality of users included in the invitee candidate list. Bonus points may be awarded and compounded in response to continuous successes in invitation.

As described above, the game service providing method according to the example embodiments may allocate bonus points to a registered user based on attributes of an invitee and thus, may motivate the registered user to invite even a user reluctant to accept an invitation.

Figure 13:
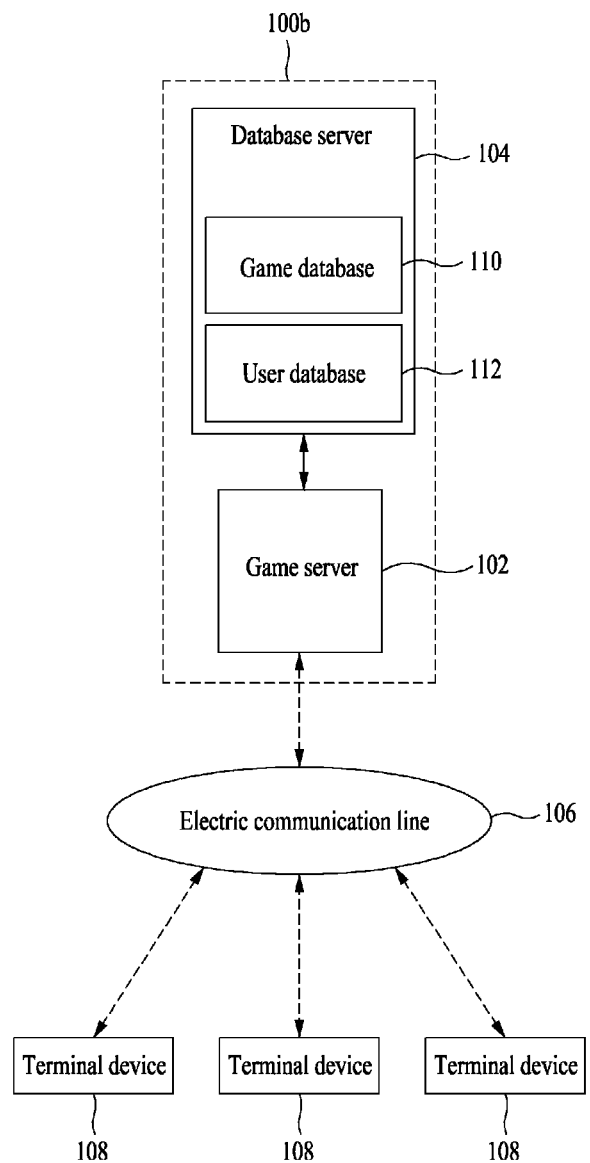
FIG. 13 illustrates a relationship between the entire configuration of a game service providing system and a terminal device of a user according to example embodiments of the present invention.

Hereinafter, a modified example will be described. FIG. 1 illustrates an example in which the game server 102 and the SNS server 114 are associated with each other and an invitation function of enabling a registered user to invite another user is embodied. However, the present invention is not limited thereto. As illustrated in FIG. 13, the invitation function may be embodied using the game server 102 and data of the database server 104 connected to the game server 102.

A game service providing system 100b may provide a plurality of game services instead of providing a single type of a game, so that a user may arbitrarily select a desired game. A plurality of users may be provided with a game service from the game service providing system 100b. Each user may arbitrarily select a game from among a plurality of game services and may play the selected game based on an individual interest or preference. Accordingly, a predetermined user and another user may be using different game services with the respective terminal devices and thus, may construct a relationship between a registered user making an invitation to a game and an invitee to be invited by the registered user, based on registration information of a game service stored in the user database 112 and data of a friendship stored in the friendship memory 112f. Here, the data refers to a friendship created within some games.

In this case, except for that the game service providing system 100 of FIG. 1 obtains data from the SNS server 114, the game service providing system 100b of FIG. 13 may embody the invitation function through the aforementioned operation, and may achieve the same effects.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be stored in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method of providing a game service, the method comprising:
   receiving, by a processor of a game management server, information of a first user associated with a terminal device;
   verifying, by the processor, that the first user is registered to a first game service;
   receiving, by the processor, information of a second user from a database, the second user having a relationship with the registered first user;
   comparing, by the processor, the information of the second user to information of users of the first game service stored in a user database of the first game service;
   determining, by the processor, whether the second user is unregistered to the first game service based on the compared information of the second user;
   calculating, by the processor, invitation points when the processor determines that the second user is unregistered to the first game service;
   calculating, by the processor, bonus invitation points having a time limit when the processor determines that the second user is unregistered to the first game service;
   allocating, by the processor, the invitation points and the bonus invitation points with the unregistered second user;
   generating, by the processor, information comprising an identification of the unregistered second user, the invitation points associated with inviting the unregistered second user, the bonus invitation points associated with inviting the unregistered second user, and the time limit associated with the bonus invitation points, for display on the terminal associated with the registered first user;
   receiving, by the processor, a selection of the unregistered second user as an invitee by the terminal;
   receiving, by the processor, registration information of the invitee to the first game service;

assigning, by the processor, the invitation points to the registered first user of the terminal when the processor receives the registration information of the invitee to the first game service; and assigning, by the processor, the bonus invitation points to the registered first user of the terminal when the processor receives the registration information of the invitee to the first game service and when the processor receives the selection of the unregistered second user as the invitee by the terminal within the time limit associated with the bonus invitation points.

2. The method of claim 1, further comprising:

creating, by the processor, a message for the registered first user to invite the invitee to the game service when the registered first user selects the invitee on the screen of the terminal device, and transmitting, by a transmitter coupled to the processor, the message to the invitee selected by the registered user.

3. The method of claim 2, further comprising:

determining, by the processor, whether the invitee connects to the game management server and has made a new registration to the first game service.

4. The method of claim 2, wherein the transmitter is an electric communication line that is connected to the Internet.

5. The method of claim 1, wherein the information of the unregistered second user comprises information from a social networking service database.

6. The method of claim 5, wherein the information from the social networking service database is located on a server different than the game management server.

7. The method of claim 1, wherein calculating the invitation points comprises:

calculating, by the processor, the invitation points based on at least one of a genre of a second game service the invitee is registered to, a login history for the second game service the invitee is registered to, and a skill level of the invitee for the second game service the invitee is registered to.

8. A non-transitory computer-readable storage medium having stored thereon processor-executable instructions configured to cause a processor of a game management server to perform operations to increase the number of registered users of a first game service, the operations comprising:

receiving information of a first user associated with a terminal device;

verifying that the first user is registered to the first game service;

receiving, by the processor, information of a second user from a database, the second user having a relationship with the registered first user;

comparing, by the processor, the information of the second user to information of users of the first game service stored in a user database of the first game service;

determining whether the second user is unregistered to the first game service based on the compared information of the second user;

calculating, by the processor, invitation points in response to determining that the second user is unregistered to the first game service;

calculating, by the processor, bonus invitation points having a time limit in response to determining that the second user is unregistered to the first game service;

allocating, by the processor, the invitation points and bonus invitation points with the unregistered second user;

generating, by the processor, information comprising the unregistered second user, the invitation points associated with inviting the unregistered second user, the bonus invitation points associated with inviting the unregistered second user, and the time limit associated with the bonus invitation points for display on the terminal associated with the registered first user;

receiving, by the processor, a selection of the unregistered second user as an invitee by the terminal;

receiving, by the processor, registration information of the invitee to the first game service;

assigning, by the processor, the invitation points to the registered first user of the terminal in based on receiving the registration information of the invitee to the first game service; and assigning the bonus invitation points to the registered first user of the terminal based on receiving the registration information of the invitee to the first game service and receiving the selection of the unregistered second user as the invitee by the terminal within the time limit associated with the bonus invitation points.

9. The method of claim 8, further comprising:

displaying information about the invitee and the invitation points on a screen of the terminal device of the registered first user.

10. The method of claim 9, further comprising:

creating a message for the registered first user to invite the invitee to the game service when the registered first user selects the invitee on the screen of the terminal device, and transmitting the message to the invitee selected by the registered first user.

11. The method of claim 10, further comprising:

determining whether the invitee connects to the game management server and has made a new registration to the first game service.

12. The method of claim 11, further comprising:

assigning the invitation points to the registered first user when the new registration of the invitee is determined.

13. A method of providing a game service, the method comprising:

receiving, by a processor of a game management server, information of a second user from a database, the second user having a relationship with a first user associated with a terminal device and registered to a first game service;

comparing, by the processor, the information of the second user to information of users of the first game service stored in a user database of the first game service;

determining, by the processor, whether the second user is unregistered to the first game service based on the compared information of the second user;

calculating, by the processor, invitation points when the processor determines that the second user is unregistered to the first game service;

allocating, by the processor, the invitation points with the unregistered second user based on the calculation of the invitation points;

determining, by the processor, whether a relationship between the registered first user and the unregistered second user is a distant connection;

calculating, by the processor, bonus invitation points when the processor determines that the relationship of the between the registered first user and the unregistered second user is the distant connection;

allocating, by the processor, the bonus invitation points with the unregistered second user based on the calculation of the bonus invitation points when the processor determines that the relationship between the first user and the second user is the distant connection;

generating, by the processor, information comprising an identification of the unregistered second user, the invitation points associated with inviting the unregistered second user, the bonus invitation points associated with inviting the unregistered second user, for display on the terminal associated with the registered first user;

receiving, by the processor, a selection of the unregistered second user as an invitee by the terminal;

receiving, by the processor, registration information of the invitee to the first game service;

assigning, by the processor, the invitation points to the registered first user of the terminal when the processor receives the registration information of the invitee to the first game service; and assigning, by the processor, the bonus invitation points to the registered first user of the terminal when the processor receives the registration information of the invitee to the first game service and when the processor determines that the relationship between the registered first user and the unregistered second user is the distant connection.

14. The method of claim 13, further comprising:

generating, by the processor, information comprising a time limit associated with the bonus invitation points to the terminal of the first user for display, wherein the processor assigns the bonus invitation points only after the processor receives the second user selected for invitation by the terminal within the time limit associated with the bonus invitation points.

* * * * *